United States Patent Office 2,698,331
Patented Dec. 28, 1954

2,698,331
11α,17α-DIHYDROXYPROGESTERONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application March 19, 1952,
Serial No. 277,522

10 Claims. (Cl. 260—397.45)

This invention relates to 11α,17α-dihydroxyprogesterone and more particularly to one to eight carbon atom carboxylic acid esters of 11α,17α-dihydroxyprogesterone.

An object of this invention is to provide 11α,17α-dihydroxyprogesterone and 11α-acyloxy-17α-hydroxyprogesterones. These compounds have utility in the synthesis of corticosterone, cortisone and other 11-oxygenated steroid esters. The 11α,17α-dihydroxyprogesterone and 11α-acyloxy-17α-hydroxyprogesterones demonstrate anaesthetic and inhibitory properties in estrogen, glucocorticoid, folliculoid, testoid, luteoid, salt retention, spermatogenic, renotropic, hypertensive and progesterone activities. Hydrolysis of the 11α-acyloxy-17α-hydroxyprogesterones followed by oxidation of the 11α,17α-dihydroxyprogesterone in glacial acetic acid with chromium trioxide produced 17α-hydroxy-4-pregnene-3,11,20-trione.

The starting 11α,17α-dihydroxyprogesterone may be prepared from 17α-hydroxyprogesterone as described in Serial No. 277,521, filed March 19, 1952, now abandoned, or in our applications, of which this is a continuation-in-part, Serial No. 180,496, filed August 19, 1950, now abandoned, and Serial No. 272,944, filed February 23, 1952, now Patent 2,602,769, issued July 8, 1952.

The following examples are illustrative of the objects, processes and products of the present invention, but are not to be construed as limiting.

Example 1.—11α,17α-dihydroxyprogesterone

A medium was prepared from twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with Rhizopus nigricans minus strain, American Type Culture Collection No. 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Rhizopus nigricans was added one gram of 17α-hydroxyprogesterone in 25 milliliters of acetone to provide a suspension of steroid in the culture. After an additional 152 hours of incubation under the same conditions of temperature and aeration, the beer and mycelium were extracted and concentrated. The mycelium was filtered off, washed twice each time with a volume of acetone equal to the rough volume of the mycelium and extracted twice each time with a volume of methylene chloride equal to the rough volume of the mycelium. The acetone extracts and the methylene chloride extracts including solvent were added to the beer filtrate. The mixed extracts and beer filtrate were extracted successively with one-half by volume of methylene chloride twice and then twice more with one-fourth by volume of the solvent. The combined methylene chloride extracts were washed twice each time with one-tenth by volume of two percent aqueous solution of sodium bicarbonate, and then twice more with one-tenth by volume of water. After drying the methylene chloride with about three to five grams of anhydrous sodium sulfate per liter of solvent, and filtering, the solvent was removed by distillation. The residue was dissolved in a minimum of methylene chloride, filtered and the solvent was then evaporated in air or on a steam bath. The resulting extract weighing 1.685 grams was dissolved in 100 milliliters of ethylene dichloride and chromatographed over 150 grams of Florisil synthetic magnesium silicate. Prior to the addition of the extract, the column was washed with 600 milliliters of acetone followed by 600 milliliters of ethylene dichloride. Solvents in 220 milliliter portions were used. Results are given in Table I.

Another run was made as above and the corresponding chromatograph fractions were combined for purposes of isolation.

Fractions 13 to 17 were recrystallized from methanol by the addition of ether to yield 260 milligrams of 11α,17α-dihydroxyprogesterone which melted at 220 to 222 degrees centigrade, had an optical rotation $[\alpha]_D^{24}$ of plus 76 degrees (1.1323 in chloroform) and an ultraviolet extinction $k_{243}$ of 46.67.

*Analysis.*—Calculated for $C_{21}H_{30}O_4$: C, 72.82; H, 8.73
Found: C, 73.18; H, 8.76
C, 72.85; H, 8.47

The mother liquors of fractions 13 to 17 and fractions 11, 12 and 18 to 20 were combined and rechromatographed in the same manner over 150 grams of Florisil thus yielding another 102 milligrams of 11α,17α-dihydroxyprogesterone.

TABLE I

| Fraction | Solvent | Eluate Solids Miligrams |
|---|---|---|
| 1 | ethylene dichloride | 105.5 |
| 2, 3 | ethylene dichloride-acetone 25:1 | 177.0 |
| 4 | ethylene dichloride-acetone 15:1 | 39.0 |
| 5 | do | 88.5 |
| 6–9 | ethylene dichloride-acetone 12:1 | 225.5 |
| 10 | ethylene dichloride-acetone 10:1 | 23.5 |
| 11, 12 | do | 73.0 |
| 13–16 | ethylene dichloride-acetone 8:1 | 316.5 |
| 17 | ethylene dichloride-acetone 5:1 | 129.5 |
| 18–20 | do | 167.0 |
| 21–23 | ethylene dichloride-acetone 2:1 | 134.5 |
| 24–26 | acetone | 57.0 |

Example 2.—11α-acetoxy-17α-hydroxyprogesterone

To a chilled solution of 41 milligrams of 11α,17α-dihydroxyprogesterone dissolved in two milliliters of pyridine (freshly distilled over barium oxide) was added three milliliters of acetic anhydride. The reaction mixture was maintained at room temperature for 15 hours, diluted with forty milliliters of ice water, and extracted with ether. The ether extract was washed with hydrochloric acid, ten percent sodium bicarbonate solution, and water, dried over anhydrous sodium sulfate and filtered. Evaporation of the filtered ether extract produced 43.5 milligrams of crystals which melted, after two recrystallizations from acetone by the addition of Skellysolve B petroleum naphtha, at 215 to 217 degrees centigrade, $[\alpha]_D^{23}$ of plus 68 degrees (1.099 in chloroform), $k_{240}$ of 40.38.

*Analysis.*—Calculated for $C_{23}H_{32}O_5$: C, 71.10; H, 8.30.
Found: C, 71.29; H, 8.37.

Example 3.—11α-formyloxy-17α-hydroxyprogesterone

A mixture of 50 milligrams of 11α,17α-dihydroxyprogesterone was heated for two hours at 75 degrees centigrade with two milliliters of 87 percent formic acid. The reaction mixture was cooled, diluted with water, chilled and filtered to separate 11α-formyloxy-17α-hydroxyprogesterone.

Example 4.—11α-propionyloxy-17α-hydroxyprogesterone

Following the procedure of Example 2, using the equivalent proportion of propionic anhydride in place of acetic anhydride, produced the separated 11α-propionyloxy-17α-hydroxyprogesterone.

Example 5.—11α-benzoxy-17α-hydroxyprogesterone

Two milliliters of benzene containing fifty milligrams of 11α,17α-dihydroxyprogesterone was mixed with 0.2 milliliter of freshly-distilled pyridine and 0.2 milliliter of freshly-distilled benzoyl chloride and maintained at room temperature for 24 hours. The reaction mixture was then diluted with twenty milliliters of ether, washed successively with water, ten percent sodium hydroxide solution, and water, dried over anhydrous sodium sulfate, filtered and evaporated free of solvent. The residue was taken up in ether, chilled to cause precipitation, filtered, and the precipitate washed with benzene to yield 11α-benzoxy-17α-hydroxyprogesterone.

*Example 6.—11α-(β-carboxypropionyloxy)-17α-hydroxyprogesterone*

Following the procedure of Example 2, using succinic anhydride in place of acetic anhydride, produced 11α-(β-carboxypropionyloxy)-17α-hydroxyprogesterone.

In a similar manner, 11α-acyloxy-17α-hydroxyprogesterones are prepared according to acylation procedures illustrated by the examples above or by reaction with ketene, ketenes of selected acids, selected acids, acid anhydrides, or acid chlorides, in an organic solvent such as pyridine or the like. Representative esters of 11α-acyloxy-17α-hydroxyprogesterones thus-prepared include one to eight carbon atom carboxylic acid acyloxy esters of saturated or unsaturated, aliphatic or carbocyclic, cycloaliphatic, aryl, arylalkyl, alkaryl, mono, di or polycarboxylic acids which form ester groups such as, for example, formyloxy, acetoxy, propionyloxy, butyryloxy, valeryloxy, hexanoyloxy, heptanoyloxy, octanoyloxy, benzoxy, phenylacetoxy, toluoyloxy, cyclopentylformoyloxy, β-cyclopentylpropionyloxy, acryIyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:
1. A compound selected from the group consisting of 11α,17α-dihydroxyprogesterone and 11α-acyloxy-17α-hydroxyprogesterone wherein acyloxy is a hydrocarboncarbonyloxy radical containing less than nine carbon atoms.
2. 11α,17α-dihydroxyprogesterone.
3. 11α-acyloxy-17α-hydroxyprogesterone wherein the acyloxy group is of the formula AcO, Ac being the acyl radical of a hydrocarbon carboxylic acid containing up to and including eight carbon atoms.
4. 11α-acetoxy-17α-hydroxyprogesterone.
5. 11α-propionyloxy-17α-hydroxyprogesterone.
6. 11α-benzoxy-17α-hydroxyprogesterone.
7. 11α - (β-carboxypropionyloxy)-17α-hydroxyprogesterone.
8. A process of preparing 11α-acetoxy-17α-hydroxyprogesterone comprising contacting 11α,17α-dihydroxyprogesterone with acetic anhydride in the presence of pyridine and separating the resulting 11α-acetoxy-17α-hydroxyprogesterone.
9. A process of preparing 11α-acyloxy-17α-hydroxyprogesterone comprising reacting 11α,17α-dihydroxyprogesterone with an acylating agent.
10. A process of preparing 11α-acyloxy-17α-hydroxyprogesterone comprising reacting 11α,17α-dihydroxyprogesterone with an organic carboxylic acid anhydride.

No references cited.